(12) United States Patent
Takeda et al.

(10) Patent No.: US 9,437,008 B1
(45) Date of Patent: Sep. 6, 2016

(54) IMAGE SEGMENTATION USING BAYES RISK ESTIMATION OF SCENE FOREGROUND AND BACKGROUND

(71) Applicant: SONY CORPORATION, Tokyo (JP)

(72) Inventors: Hiroyuki Takeda, San Jose, CA (US); Mohammad Gharavi-Alkhansari, San Jose, CA (US)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/804,444

(22) Filed: Jul. 21, 2015

(51) Int. Cl.
  *G06K 9/34* (2006.01)
  *G06T 7/00* (2006.01)
  *G06K 9/52* (2006.01)
  *G06T 7/40* (2006.01)
  *G06K 9/62* (2006.01)

(52) U.S. Cl.
  CPC ............... *G06T 7/0087* (2013.01); *G06K 9/52* (2013.01); *G06K 9/6267* (2013.01); *G06T 7/0051* (2013.01); *G06T 7/40* (2013.01); *G06T 2207/20144* (2013.01)

(58) Field of Classification Search
  None
  See application file for complete search history.

(56) References Cited

U.S. PATENT DOCUMENTS

| | | | |
|---|---|---|---|
| 6,282,317 B1 | 8/2001 | Luo et al. | |
| 7,536,050 B2 * | 5/2009 | Boykov | G06K 9/342 382/171 |
| 7,995,810 B2 * | 8/2011 | Li | G06K 9/4638 382/128 |
| 8,498,481 B2 * | 7/2013 | Blake | G06T 7/0081 382/173 |
| 2008/0019574 A1 | 1/2008 | Scalise et al. | |
| 2009/0324078 A1 * | 12/2009 | Wu | G06T 7/0083 382/173 |

OTHER PUBLICATIONS

Premachandran, V., "Empirical Minimum Bayes Risk Prediction: How to Extract an Extra Few % Performance from Vision Models with Just Three More Parameters", 2014 IEEE Conference on Computer Vision and Pattern Recognition (CVPR), Jun. 23-28, 2014, Columbus, Ohio, pp. 1-8.

* cited by examiner

*Primary Examiner* — Eueng-Nan Yeh
(74) *Attorney, Agent, or Firm* — O'Banion & Ritchey LLP; John P. O'Banion

(57) ABSTRACT

Enhancing segmentation of objects within an image by utilizing an error cost value. Each error cost value comprises a cost value $C_{fb}$ if segmentation decides on foreground for an element that should be background, and a cost value $C_{bf}$ if segmentation decides on background for an element that should be in the foreground. Different areas of an image are estimated and error cost values assigned for a definite foreground (very high $C_{bf}$ and very low $C_{fb}$), a definite background (very high $C_{fb}$ and very low $C_{bf}$), an initial foreground (high $C_{bf}$ and low $C_{fb}$), and an initial background (high $C_{fb}$ and low $C_{bf}$). These error costs are utilized in combination with conventional segmentation decisions to modify those segmentation decisions and thus enhance segmentation accuracy.

20 Claims, 8 Drawing Sheets

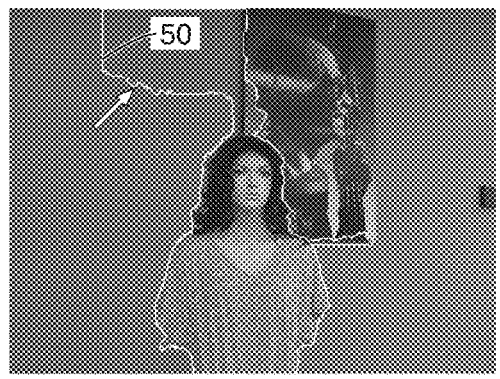
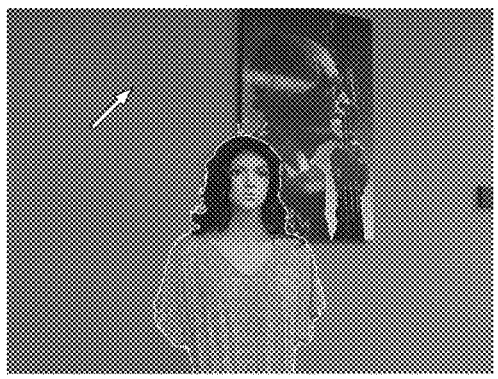
FIG. 6A  FIG. 6B
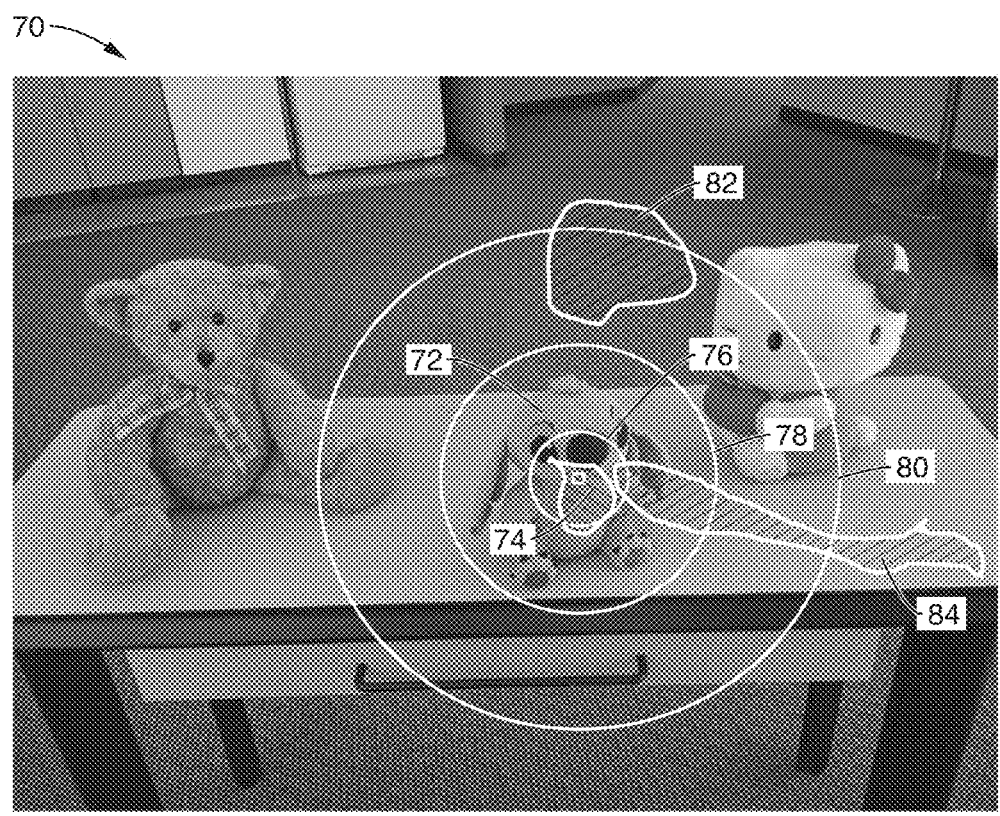
FIG. 7

IMAGE SEGMENTATION USING BAYES RISK ESTIMATION OF SCENE FOREGROUND AND BACKGROUND

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF COMPUTER PROGRAM APPENDIX

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND

1. Technological Field

This technical disclosure pertains generally to image segmentation, and more particularly to utilizing a Bayes risk assessment in the determination of which pixels are assigned to a foreground and a background.

2. Background Discussion

Image segmentation is a process of partitioning an image into regions under certain rules. The simplest case would be to separate the foreground object, such as humans, from the background, or conversely the background from the foreground. Image segmentation can be utilized as a basis for many image processing operations, including deleting or moving image objects, generating 3D effects, stroboscopic imaging, autofocusing, and so forth.

In many images it can be challenging to discern the foreground elements from the background. This problem arises as there are portions of an image which could be selected to be either with the foreground or in the background. That is to say the metrics used to decide whether a pixel is to be in the foreground/background are not definitive—and probabilities in some cases are as low as 50%, making any decision questionable ("iffy"). The result of improper choices is that one or more artifacts from the background remain in, or attached to, the foreground object or conversely that elements of the foreground remain in the background. Unfortunately, the quality of a given segmentation process is significantly determined on the basis of this discernment.

Accordingly, a need exists for a method of improving these choices when assigning image pixel elements to the foreground or to the background. The present disclosure presents such a solution while overcoming shortcomings of previous segmentation selection mechanisms.

BRIEF SUMMARY

A method for optimizing segmentation decisions is described, which is based on determining cost penalties for wrong segmentation decisions. In at least one embodiment, this optimization makes use of not only the color components of image information, but can also utilize additional information, such as depth information, or contrast mapping, or texture mapping, or other metrics and combinations thereof. These cost decisions are described for cases of known objects, exemplified herein as human objects, and for unknown objects.

In one application, these cost decisions are utilized to aid segmentation decisions when segmenting image objects to improve autofocus decisions performed for moving objects. As a result of adding error costing to the segmentation decisions, significantly improved performance is achieved in cases where the object is subject to significant or unpredictable motion.

The segmentation decisions are optimized in this disclosure in response to utilizing a Bayes risk determination applied to foreground and/or background regions. This risk calculation provides rough information on whether an element belongs to the foreground or background prior to performing a main segmentation process, which itself arrives at a local decision on foreground/background.

Further aspects of the presented technology will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWING(S)

The disclosed technology will be more fully understood by reference to the following drawings which are for illustrative purposes only:

FIG. 6A and FIG. 6B are images showing image segmentation performed without Bayes risk assessment (FIG. 6A), and with Bayes risk assessment (FIG. 6B) according to an embodiment of the present disclosure.

FIG. 7 is an image illustrating initial image areas surrounding an arbitrary object into which pixels are assigned utilizing Bayes risk assessment according to an embodiment of the present disclosure.

DETAILED DESCRIPTION

1. Introduction of Bayes Risk for Segmentation

A method of determining Bayes Risk for image pixels being assigned to a foreground or a background, such as within an image segmentation process, are described. This "risk", is the risk of making a wrong decision as to whether pixels or a pixel group should be assigned to a foreground or a background. Consider the case when segmentation categorizes an unknown pixel as foreground when it would be more properly categorized as the background, or conversely categorizing an unknown pixel as background when it should be categorized as foreground. As insufficient image information generally exists in the segmentation process to make a definitive selection of foreground or background, this risk assessment method assesses which case is riskier, and thus can be utilized in combination with techniques used for determining whether a pixel is to be assigned to the foreground/background to enhance segmentation selections which are subject to fewer significant artifacts and/or image anomalies.

Figure 1A:
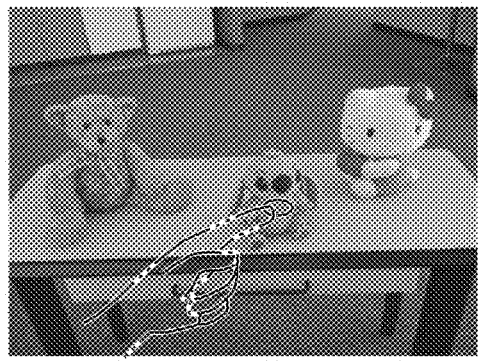
FIG. 1A and FIG. 1B are images depicting a segmentation process performed in response to user object selection from the image.
Figure 1B:

FIG. 1A and FIG. 1B depict a segmentation process in which the user selects an object in FIG. 1A for segmentation, the results of which are seen in FIG. 1B. For the image segmentation problem, the risk of selecting whether pixels belong to the object (foreground) or not to the object (background) is spatially dependent. In an image segmentation based on a user object selection, it can be beneficial to reduce the chance of categorizing an unknown pixel as background when it should be categorized as foreground. Similarly, in image regions away from this user-selected point, it can be beneficial to reduce the chance of categorizing an unknown pixel as foreground when it would be more properly categorized as background.

The present disclosure utilizes a cost metric in aiding the decision process, with the cost being the 'price' (cost or impact) for making a wrong decision. This cost is represented by $C_{fb}$ if segmentation decides on foreground for an element that should be background (background is true), with the cost represented by $C_{bf}$ if segmentation decides on background for an element that should be in the foreground (foreground is true). The overall risk R is then defined as:

$$R = C_{fb} p(H_{fore}|H_{back}) p(H_{back}) + C_{bf} p(H_{back}|H_{fore}) p(H_{fore}) \quad (1)$$

where H is a hypothesis. Hfore and Hback can be regarded as a label of the pixel either foreground or background. The function p( ) indicates the probability, which can be any real value between 0 and 1. The value p(Hfore) and p(Hback) are called prior probability, and p(Hfore|Hback) and p(Hback|Hfore) are called conditional probability.

In order to minimize Bayes risk, it is necessary to modify the classifier and decide the unknown pixel x the foreground if $$\frac{C_{bf} p(H_{back}|H_{fore}) p(H_{fore})}{C_{fb} p(H_{fore}|H_{back}) p(H_{back})} > 1 \quad (2)$$

In minimizing risk, the algorithm decides how to segment the image (or to classify the pixels into foreground and background). It will be noted that it would be very difficult to find a reasonable mask unless a good initial object mask is provided. However, having a good initial object mask is not an easy problem. Instead, the user can tell the pixel classifier the risk for making a wrong decision, although different embodiments can be configured to provide baseline values for a given set of applications. The risk helps the pixel classifier to find a reasonable mask.

2. Choice of the Costs for Human Objects

Figure 2:
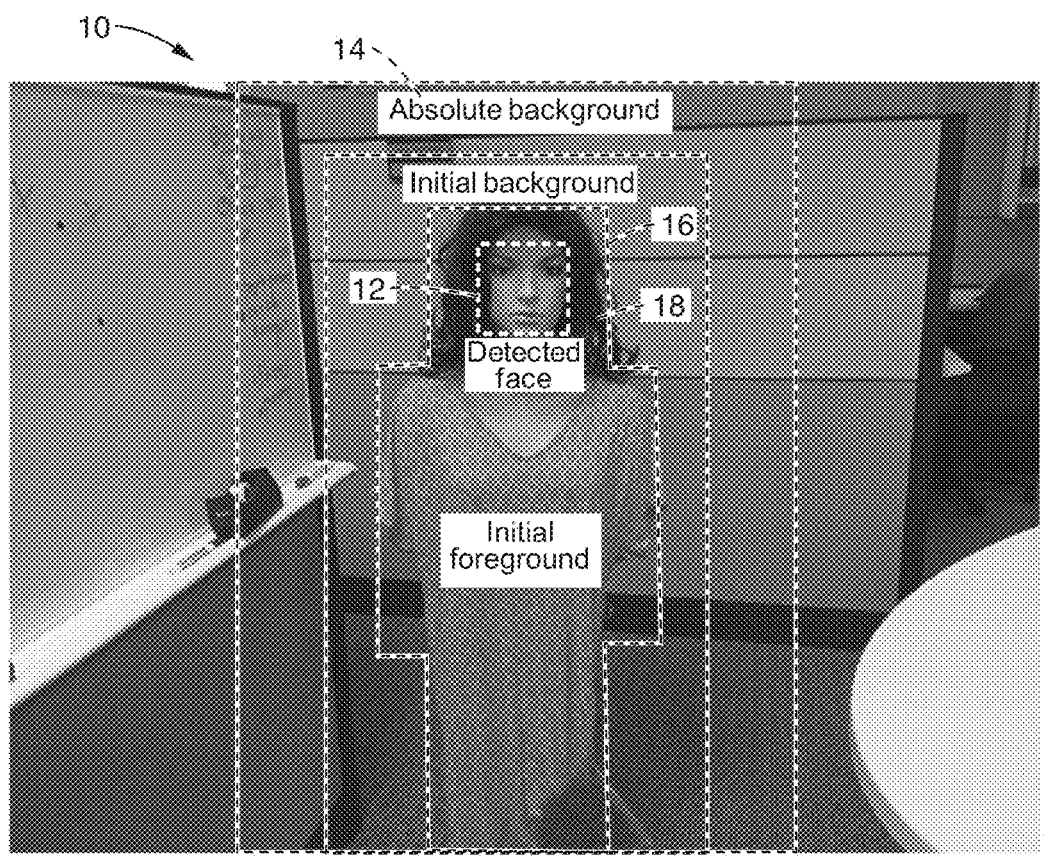
FIG. 2 is an image illustrating initial image areas surrounding a human object into which pixels are assigned utilizing Bayes risk assessment according to an embodiment of the present disclosure.

FIG. 2 illustrates an example embodiment 10 of simple mapping for assessing costs for a human object 12, showing regions about the human object which are absolute (definite) background 14 (very high $C_{fb}$ and very low $C_{bf}$), initial background 16 (high $C_{fb}$ and low $C_{bf}$), and initial foreground 18 (low $C_{fb}$ and high $C_{bf}$).

Since estimating the definite background or foreground regions, at least one embodiment uses 1.0 for lowest risk and the infinite value for the highest risk. The user has a full control of the choice of risk. The risk would completely depend on the situation. One can think of this risk as the penalty or price to pay for making a wrong decision.

It will be appreciated that the determination of a definite background is best performed for frontal human objects. For human objects, it is extremely difficult to make a guess as to which pixels belong to that person. Perhaps, the best that can be done is to identify the definite background region.

The segmentation can be regarded as a classification of pixels into foreground or background. In at least one embodiment of segmentation, in addition to the pixel color values, red, green, blue, a vector X is formed including depth and histogram contrast for each pixel, as X=[red, green, blue, depth, histogram contrast], upon which segmentation decision are based. The foreground object is thus segmented out by the present method in response to classifying the 5×1 vectors.

It will be appreciated that the additional image information may be utilized in selecting the area of the pre-determined areas, including the absolute foreground, initial foreground, initial background, and absolute background. For example, the method can pre-segment (or quantize) the input image including other information, such as depth, or histogram contrast map, or texture map, or any combination thereof in addition to color channel information (e.g., red, green, and blue values).

Figure 3:
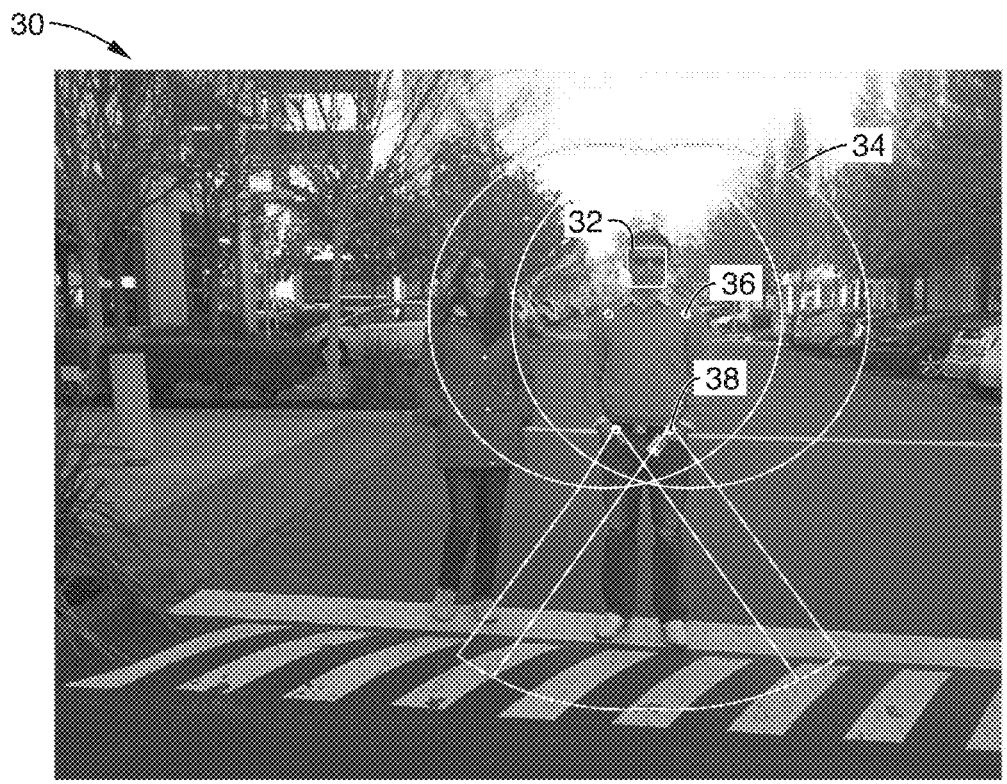
FIG. 3 and FIG. 4 are images of determining initial image areas according to an embodiment of the present disclosure, showing each of two human objects.
Figure 4:
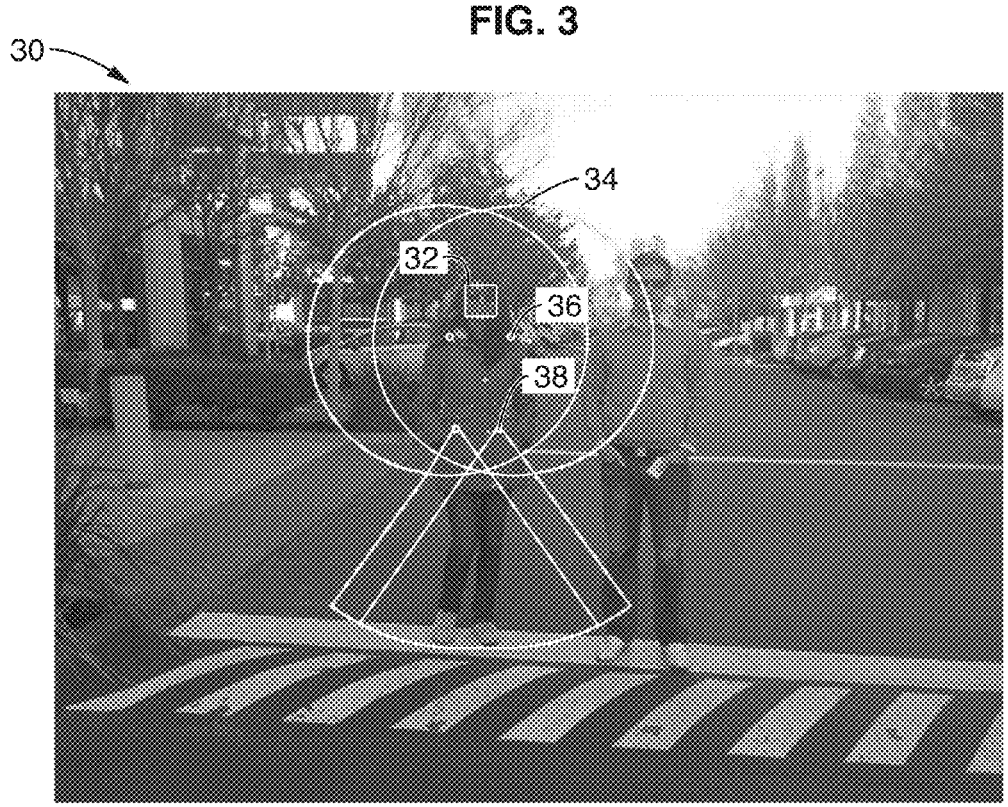

FIG. 3 and FIG. 4 illustrate examples 30 of human object selection according to the present disclosure. Based on the detected face position and size 32, the method estimates the positions of shoulder joints 36 and hip joints 38, and then generates ('draws') a "key-hole" shape boundary 34, outside of which is considered the absolute background with the assumption made that no pixel outside of boundary 34 is foreground.

In order to have better definite background regions, an image quantization process is applied to the image, and then the sub-regions outside of the possible foreground area (the area inside boundary 34 shown in FIG. 3 and FIG. 4) are categorized.

Figure 5A:
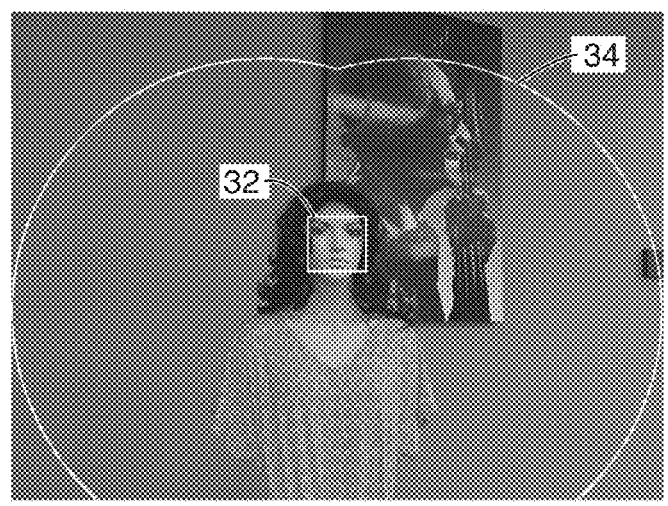
FIG. 5A through FIG. 5C are images in the process of utilizing a Bayes risk assessment according to an embodiment of the present disclosure.
Figure 5B:
Figure 5C:
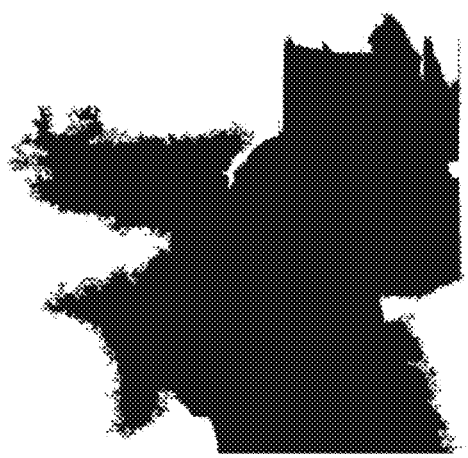

FIG. 5A through FIG. 5C illustrate the process of this human object selection. In FIG. 5A is seen this same human object selection as above based on detecting face 32 followed by generating boundary selection 34. Application of image quantization results in the image shown in FIG. 5B. By way of example and not limitation, the image was quantized by minimum variance quantization (e.g., Matlab® routine 'rgb2ind' with 36 colors). Then the sub-regions touching the boundary outside of the possible foreground region, or touching the line, are selected with isolated foreground regions removed, leaving a definite background area, seen as the white area in FIG. 5C to which a very high $C_{fb}$ value is assigned.

FIG. 6A and FIG. 6B compare segmentation results without Bayes risk in FIG. 6A, and with Bayes risk assessment in FIG. 6B. It is seen in FIG. 6A segmentation without assessing Bayes risk results in a false foreground boundary 50, which is eliminated as seen in FIG. 6B by including this Bayes risk determination.

It should be appreciated that the human object detection process described above is generally applicable to any known-object type (e.g., automobiles, animals, airplanes, etc.), that is to say any object having a set of determined characteristics which can be utilized for identification of an object of that type within an image.

3. Choice of the Costs for General Objects

The disclosure is also configured for segmentation risk assessment on foreground and background regions for general objects as follows. Similar to the human objects, the process first carries out image quantization, and the image is split into several sub-regions.

FIG. 7 illustrates an example image 70 for which the central stuffed animal 72 has been selected for segmentation, and the disclosed process has determined appropriate sub-regions. A definite foreground region 74 is assumed under the user-selected point of object selection (such as touch selection area), and bounded by an initial foreground boundary 76 (e.g., the diameter selected as half of the finger mark size). An initial presumption on an object size boundary 78 is made (e.g., the diameter selected as finger mark size). Then, an initial background boundary is estimated 80 about the object, such as based on size of the touch screen input (e.g., a diameter of twice the finger mark size). A definite background is initially categorized as sub-regions outside or touching the initial background boundary 80, however, these sub-regions exclude areas which reach the possible foreground boundary or the definite foreground region. A sub-region 82 of the absolute background is shown, and a sub-region 84 is shown which reaches both absolute foreground and absolute background, which is excluded from both regions.

Figure 8A:
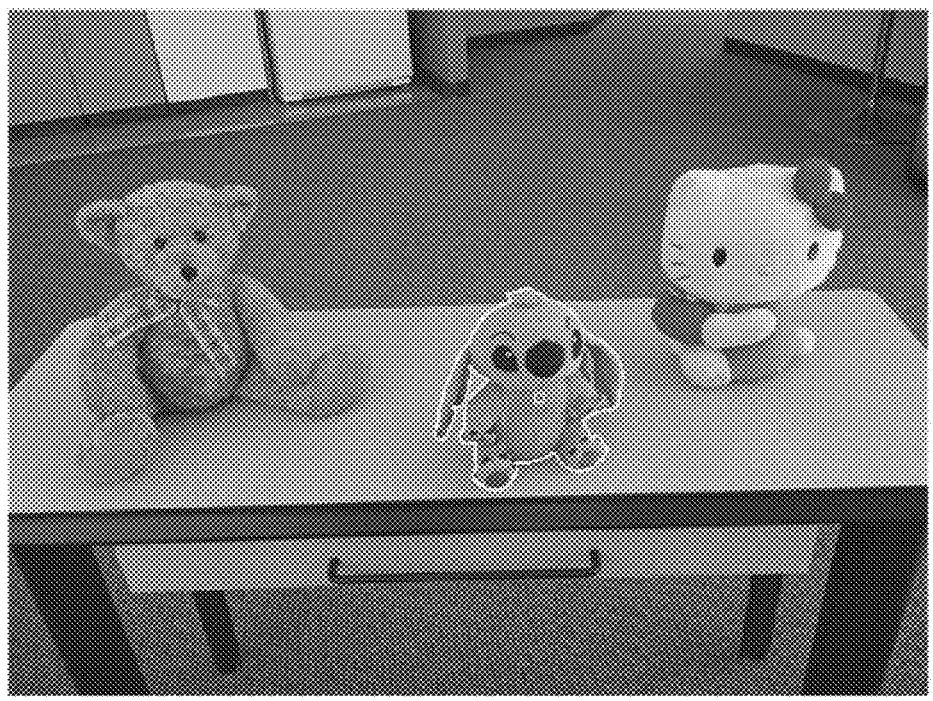
FIG. 8A through FIG. 8D are images in the process of utilizing a Bayes risk assessment according to an embodiment of the present disclosure for performing a segmentation of an arbitrary object.
Figure 8B:
Figure 8C:
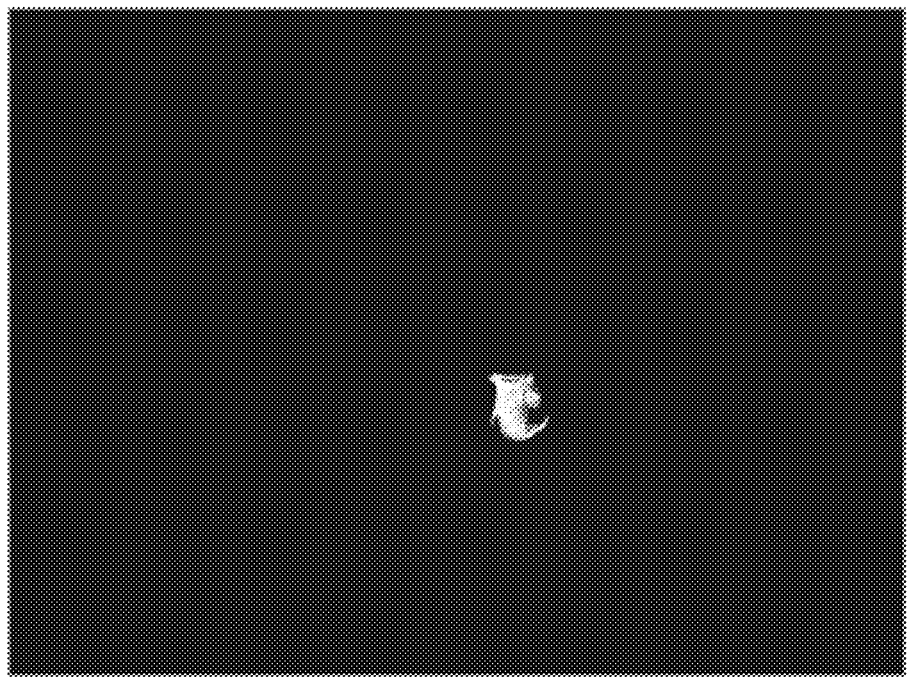
Figure 8D:
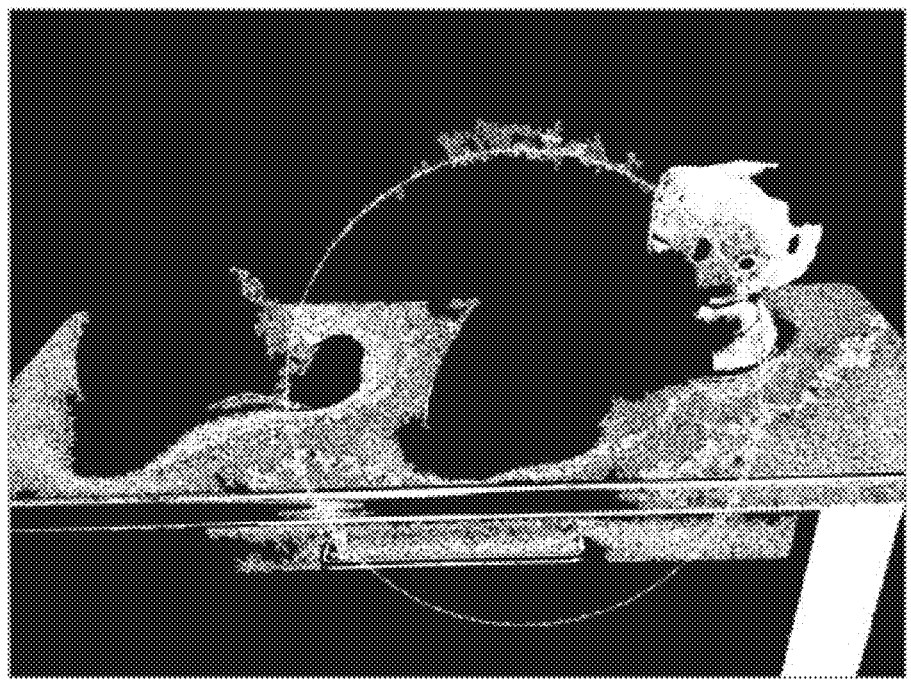

FIG. 8A through FIG. 8D illustrate a cost choice example for general objects during a segmentation process. An input image is seen in FIG. 8A upon which the user-selected center stuffed animal object is seen with a surrounding segmentation border depicting a segmentation result. FIG. 8B illustrates the original image after quantization. In FIG. 8C is seen the definite foreground areas generated from the quantized image, in which this area is assigned a very high $C_{bf}$ value. In FIG. 8D is seen the definite background areas generated from the quantized image, in which this area is assigned a very high $C_{fb}$ value.

In at least one embodiment, depth information is utilized to provide increased reliability in deciding the pre-determined foreground and background regions. Furthermore, other information, including a histogram contrast map, and/or a texture map, may be utilized in addition to the image and depth information to increase segmentation accuracy.

It should be appreciated that the disclosure presents a cost-choice process which is only one part of a larger image object segmentation method. The use of the cost-choice decision are beneficial for aiding proper segmentation by assessing a proper cost value for making wrong segmentation decisions.

Beyond its use in reducing segmentation errors, the disclosed classifier may be utilized for classifying any type of dataset. In particular, although the examples of using this classifier are directed to image segmentation with the classification of color pixels, it can be utilized to classify a large set of images into certain groups.

Furthermore, it will be appreciated that other applications exist for the general process described herein, for example social network services, (e.g., Facebook, Google+), video surveillance systems, machine vision, machine vision in the robotics field and automotive industry, and so forth.

Figure 9:
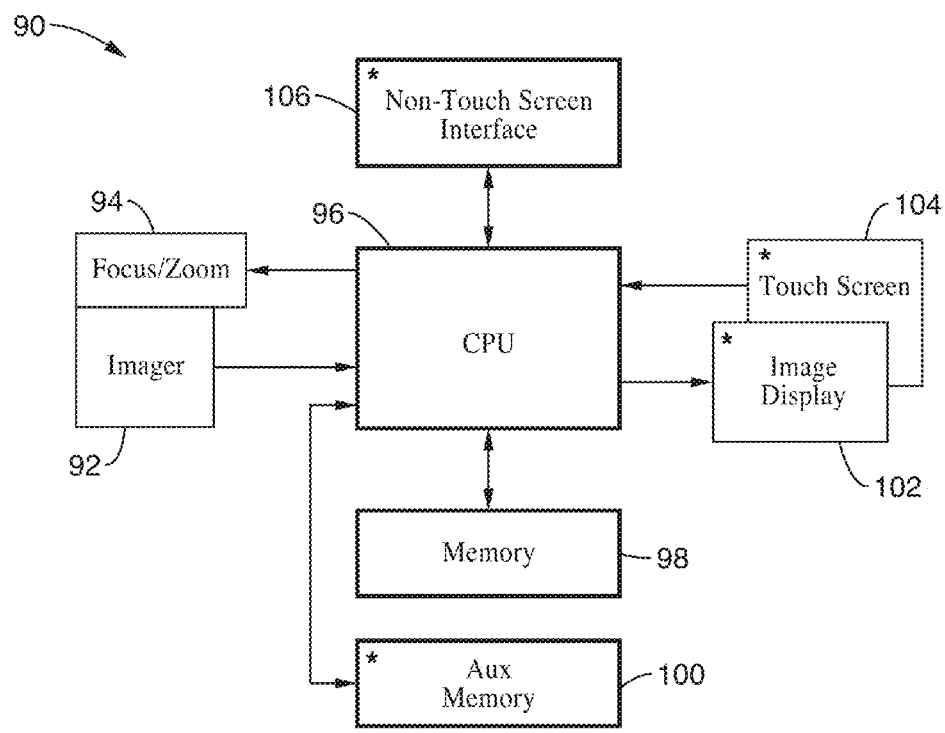
FIG. 9 is a block diagram of an image capture device upon which segmentation is performed utilizing Bayes risk assessment according to an embodiment of the present disclosure.

FIG. 9 illustrates an example embodiment 90 of a device configured for performing segmentation area risk assessment. In a typical application, the risk assessment and associated segmentation are performed on a camera device or an image capturing cellular phone device (or digital pad, laptop, or other digital device configured with image capture capabilities), as shown in the figure for capturing still and/or video images/frames. An imager 92 is shown, with associated focus/zoom 94 for outputting collected images to a computer processor 96 (e.g., one or more central processing units (CPUs), microcontrollers, and/or digital signal processors (DSPs)), which is coupled to at least one memory 98 and optionally to auxiliary memory 100, such as removable media. In addition, it will be appreciated that image capture device 90 can be configured for generating depth information across the image, or contrast mapping, or texture mapping, or other image characteristics and combinations thereof, for use to enhance the risk assessment and increase the quality of pixel assignments to foreground and background according to the present disclosure. As techniques are well known for generating these additional outputs from an image capture device (e.g., in hardware, software, or a combination of hardware and software), there is no necessity to discuss these techniques herein.

Other elements are depicted for a conventional image capturing system (e.g., camera), including interfaces shown by way of example as an optional image display 102, optional touch screen 104, and optional non-touch screen interface 106, which exist on typical camera systems, although they are not necessary for practicing the present invention.

Computer processor 96 in combination with memory 98 (and/or auxiliary memory 100) perform the risk assessment steps described within the wider context of an image segmentation process. It will be appreciated that programming stored on memory 98 (100), is executable on computer processor 96. The present invention is non-limiting with regard to the configuration of this memory, insofar as it is non-transitory in nature, and thus not constituting a transitory electronic signal.

Accordingly, the invention may comprise any form of computer-readable media, including those which are random access (e.g., RAM), require periodic refreshing (e.g., DRAM), those that degrade over time (e.g., EEPROMS, FLASH, disk media), or that store data for only short periods of time and/or only in the presence of power, with the only limitation being that the term "computer readable media" is not applicable to an electronic signal which is transitory.

It should be appreciated that the teachings of the present disclosure are not limited to the camera device exemplified in FIG. 9, but may be utilized in any device configured for capturing and/or processing images, wherein segmentation decisions can be enhanced utilizing the disclosed risk assessment. Other devices upon which the present invention can be implemented include, but are not limited to: still cameras, video cameras, combination still and video cameras, camera equipped cell phones, camera equipped laptops, pads, notebooks, scanners, security cameras, and the like.

Figure 10:
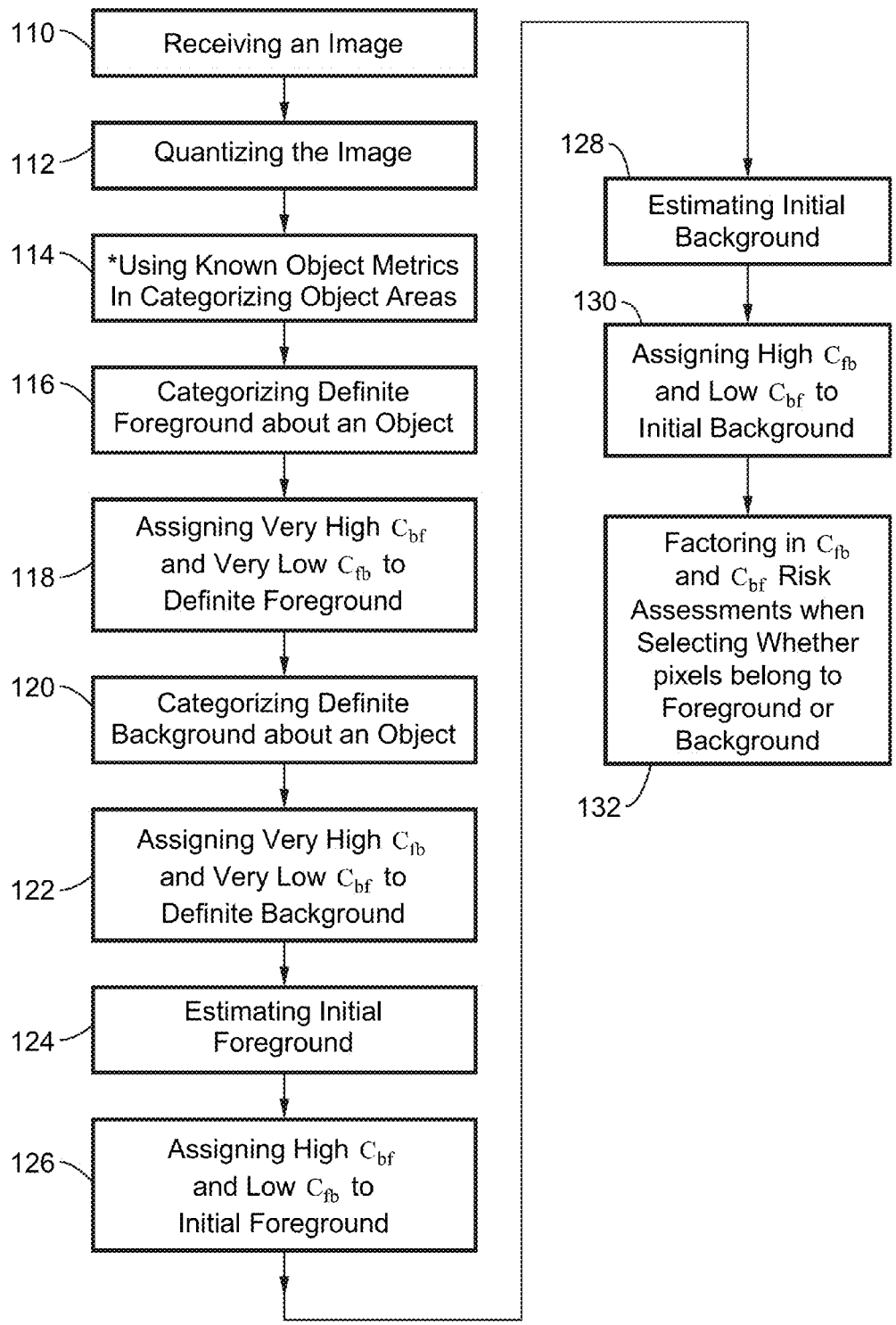
FIG. 10 is a flow diagram of steps in utilizing Bayes risk assessment according to an embodiment of the present disclosure during a segmentation process.

FIG. 10 illustrates an example embodiment of the risk assessment within an image segmentation context. An image is received 110, and is quantized 112. For known object types, known object metrics are preferably utilized (if they are available) for categorizing object areas 114. It will be appreciated that known object types are classes of objects for which recognition information and/or image processing routines are available. Any of these can be utilized in combination with the present disclosure for aiding in determining the extent of the object and thus making initial assessments for the foreground and the background.

The definite foreground about an object 116 is determined, whether using metrics for known objects, or for objects in general (arbitrary object). A very high $C_{bf}$ and very low $C_{fb}$ is then assigned to this definite foreground 118. Based on the definite foreground and any rules about the object which are known, a definite background is determined surrounding the object 120. Then a very high $C_{fb}$ and very low $C_{bf}$ is assigned to the definite background 122. Estimation of an initial foreground 124 is performed and high $C_{bf}$ and low $C_{fb}$ are assigned 126 to it. An initial background is estimated 128, followed by assigning 130 high $C_{fb}$ and low $C_{bf}$ to this initial background. When performing segmentation, the risk values $C_{fb}$ and $C_{bf}$ are taken into account 132 when selecting whether pixels belong to the foreground or the background.

Embodiments of the present technology may be described with reference to flowchart illustrations of methods and systems according to embodiments of the technology, and/or algorithms, formulae, or other computational depictions, which may also be implemented as computer program products. In this regard, each block or step of a flowchart, and combinations of blocks (and/or steps) in a flowchart, algorithm, formula, or computational depiction can be implemented by various means, such as hardware, firmware, and/or software including one or more computer program instructions embodied in computer-readable program code logic. As will be appreciated, any such computer program instructions may be loaded onto a computer, including without limitation a general purpose computer or special purpose computer, or other programmable processing apparatus to produce a machine, such that the computer program instructions which execute on the computer or other programmable processing apparatus create means for implementing the functions specified in the block(s) of the flowchart(s).

Accordingly, blocks of the flowcharts, algorithms, formulae, or computational depictions support combinations of means for performing the specified functions, combinations of steps for performing the specified functions, and computer program instructions, such as embodied in computer-readable program code logic means, for performing the specified functions. It will also be understood that each block of the flowchart illustrations, algorithms, formulae, or computational depictions and combinations thereof described herein, can be implemented by special purpose hardware-based computer systems which perform the specified functions or steps, or combinations of special purpose hardware and computer-readable program code logic means.

Furthermore, these computer program instructions, such as embodied in computer-readable program code logic, may also be stored in a computer-readable memory that can direct a computer or other programmable processing apparatus to function in a particular manner, such that the instructions stored in the computer-readable memory produce an article of manufacture including instruction means which implement the function specified in the block(s) of the flowchart(s). The computer program instructions may also be loaded onto a computer or other programmable processing apparatus to cause a series of operational steps to be performed on the computer or other programmable processing apparatus to produce a computer-implemented process such that the instructions which execute on the computer or other programmable processing apparatus provide steps for implementing the functions specified in the block(s) of the flowchart(s), algorithm(s), formula(e), or computational depiction(s).

It will further be appreciated that "programming" as used herein refers to one or more instructions that can be executed by a processor to perform a function as described herein. The programming can be embodied in software, in firmware, or in a combination of software and firmware. The programming can be stored local to the device in non-transitory media, or can be stored remotely such as on a server, or all or a portion of the programming can be stored locally and remotely. Programming stored remotely can be downloaded (pushed) to the device by user initiation, or automatically based on one or more factors. It will further be appreciated that as used herein, that the terms processor, central processing unit (CPU), and computer are used synonymously to denote a device capable of executing the programming and communication with input/output interfaces and/or peripheral devices.

From the description herein, it will be appreciated that that the present disclosure encompasses multiple embodiments which include, but are not limited to, the following:

1. An apparatus for segmenting an object from within an image, comprising: (a) at least one processor configured for processing of a received image; and (b) memory storing instructions; (c) said instructions when executed by the processor performing steps comprising: (c)(i) receiving an image and at least a selection point for an object being selected in said image to which image segmentation is to be performed, within an electronic device configured for performing image processing; (c)(ii) quantizing the image; (c)(iii) estimating an area of the image covered by a definite foreground, a definite background, an initial foreground, and an initial background; (c)(iv) assigning sets of risk values to each of said definite foreground, a definite background, an initial foreground, and an initial background; (c)(v) wherein each of said risk values comprises a cost value $C_{fb}$ if segmentation decides on foreground for an element that should be background, and a cost value $C_{bf}$ if segmentation decides on background for an element that should be in the foreground; (c)(vi) wherein for said initial foreground, a cost value $C_{bf}$ is assigned which is higher than cost value $C_{fb}$, while for said initial background a cost value $C_{fb}$ is assigned which is higher than cost value $C_{bf}$; (c)(vii) wherein for said definite foreground, a cost value $C_{bf}$ is assigned which is significantly larger than cost value $C_{fb}$, while for said definite background a cost value $C_{fb}$ is assigned which is significantly higher than cost value $C_{bf}$ with a difference between cost values assigned to the definite foreground and definite background being significantly larger than assigned to the initial foreground and initial background; and (c)(viii) making segmentation decisions for the pixels in an image based on information from that image, and modifying those segmentation decisions based on the cost values of the area in which the pixels are found.

2. The apparatus of any preceding embodiment, wherein said apparatus comprises an image capture device selected from the group of still and video image capture devices consisting of cameras, cellular phones, pads, tablets, laptops, notebooks and surveillance equipment.

3. The apparatus of any preceding embodiment, wherein said instructions when executed by the processor further performing steps comprising utilizing a known object detection process for estimating the extent of said definite foreground, and said initial foreground.

4. The apparatus of any preceding embodiment, wherein said known object detection process comprises a human object detection process.

5. The apparatus of any preceding embodiment, wherein said instructions when executed by the processor are configured for making said segmentation decisions as determined in response to information about the image as selected from the group of available image information consisting of depth information, contrast mapping, and texture mapping.

6. The apparatus of any preceding embodiment, wherein assigning of risk values can be determined by the user.

7. The apparatus of any preceding embodiment, wherein said selection point for an object being selected comprises a touch screen input.

8. The apparatus of any preceding embodiment, wherein said instructions when executed by the processor further perform steps comprising making an initial presumption about the object area based on contact area of said selection point detected on the touch screen input.

9. The apparatus of any preceding embodiment, wherein said instructions when executed by the processor are configured to assess overall risk R as:

$$R = C_{fb} p(H_{fore}|H_{back}) p(H_{back}) + C_{bf} p(H_{back}|H_{fore}) p(H_{fore})$$

where H is a hypothesis, Hfore and Hback is a label of the pixel either foreground or background, with function p( ) indicating probability which can be any real value between 0 and 1, so that value p(Hfore) and p(Hback) are prior probability, and p(Hfore|Hback) and p(Hback|Hfore) are conditional probability.

10. The apparatus of any preceding embodiment, wherein said instructions when executed by the processor are configured for minimizing overall risk R by modifying the classifier and deciding unknown pixel x being in the foreground if $$\frac{C_{bf} p(H_{back}|H_{fore}) p(H_{fore})}{C_{fb} p(H_{fore}|H_{back}) p(H_{back})} > 1.$$

11. An apparatus for segmenting an object from within an image, comprising: (a) at least one processor configured for processing of a received image; and (b) memory storing instructions; (c) said instructions when executed by the processor performing steps comprising: (c)(i) receiving an image and at least a selection point for an object being selected in said image to which image segmentation is to be performed, within an electronic device configured for performing image processing; (c)(ii) receiving additional image information comprising depth information, or contrast mapping, or texture mapping, or any combination of this information, upon which to assess risk and make segmentation decisions; (c)(iii) quantizing the image; (c)(iv) estimating an area of the image covered by a definite foreground, a definite background, an initial foreground, and an initial background; (c)(v) assigning sets of risk values to each of said definite foreground, a definite background, an initial foreground, and an initial background; (c)(vi) wherein each of said risk values comprises a cost value $C_{fb}$ if segmentation decides on foreground for an element that should be background, and a cost value $C_{bf}$ if segmentation decides on background for an element that should be in the foreground; (c)(vii) wherein for said initial foreground, a cost value $C_{bf}$ is assigned which is higher than cost value $C_{fb}$, while for said initial background a cost value $C_{fb}$ is assigned which is higher than cost value $C_{bf}$; (c)(viii) wherein for said definite foreground, a cost value $C_{bf}$ is assigned which is significantly larger than cost value $C_{fb}$, while for said definite background a cost value $C_{fb}$ is assigned which is significantly higher than cost value $C_{bf}$ with a difference between cost values assigned to the definite foreground and definite background being significantly larger than assigned to the initial foreground and initial background; and (c)(ix) making segmentation decisions for the pixels in an image based on information from that image, and modifying those segmentation decisions based on the cost values of the area in which the pixels are found.

12. A method of segmenting an object from within an image, comprising: (a) receiving an image and at least a selection point for an object being selected in said image to which image segmentation is to be performed, within an electronic device configured for performing image processing; (b) quantizing the image; (c) estimating an area of the image covered by a definite foreground, a definite background, an initial foreground, and an initial background; (d) assigning sets of risk values to each of said definite foreground, a definite background, an initial foreground, and an initial background; (e) wherein each of said risk values comprises a cost value $C_{fb}$ if segmentation decides on foreground for an element that should be background, and a cost value $C_{bf}$ if segmentation decides on background for an element that should be in the foreground; (f) wherein for said initial foreground, a cost value $C_{bf}$ is assigned which is higher than cost value $C_{fb}$, while for said initial background a cost value $C_{fb}$ is assigned which is higher than cost value $C_{bf}$; (g) wherein for said definite foreground, a cost value $C_{bf}$ is assigned which is significantly larger than cost value $C_{fb}$, while for said definite background a cost value $C_{fb}$ is assigned which is significantly higher than cost value $C_{bf}$ with a difference between cost values assigned to the definite foreground and definite background being significantly larger than assigned to the initial foreground and initial background; and (h) making segmentation decisions for the pixels in an image based on information from that image, and modifying those segmentation decisions based on the cost values of the area in which the pixels are found.

13. The method of any preceding embodiment, further comprising utilizing a known object detection process for estimating the extent of said definite foreground, and said initial foreground.

14. The method of any preceding embodiment, wherein said known object detection process comprises a human object detection process.

15. The method of any preceding embodiment, wherein said segmentation decisions are further determined in response to information about the image selected from the group of available image information consisting of depth information, contrast mapping, texture mapping.

16. The method of any preceding embodiment, wherein assigning of risk values is determined by the user.

17. The method of any preceding embodiment, wherein said selection point for an object being selected comprises a touch screen input, and making an initial presumption about the object area based on contact area of said selection point detected on the touch screen input.

18. The method of any preceding embodiment, wherein overall risk R is defined as:

$$R = C_{fb}p(H_{fore}|H_{back})p(H_{back}) + C_{bf}p(H_{back}|H_{fore})p(H_{fore})$$

where H is a hypothesis, Hfore and Hback is a label of the pixel either foreground or background, with function p( ) indicating probability which can be any real value between 0 and 1, so that value p(Hfore) and p(Hback) are prior probability, and p(Hfore|Hback) and p(Hback|Hfore) are conditional probability.

19. The method of any preceding embodiment, wherein overall risk R is minimized by modifying the classifier and deciding unknown pixel x being in the foreground if $$\frac{C_{bf}p(H_{back}|H_{fore})p(H_{fore})}{C_{fb}p(H_{fore}|H_{back})p(H_{back})} > 1.$$

20. The method of any preceding embodiment, wherein said electronic device is selected from the group of imaging devices consisting of cameras, cellular phones, pads, tablets, laptops, notebooks and surveillance equipment.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

In the claims, reference to an element in the singular is not intended to mean "one and only one" unless explicitly so stated, but rather "one or more." All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

What is claimed is:

1. An apparatus for segmenting an object from within an image, comprising:
    (a) at least one processor configured for processing of a received image; and
    (b) memory storing instructions;
    (c) said instructions when executed by the processor performing steps comprising:
        (i) receiving an image, comprising pixels, and at least a selection point for an object being selected in said image to which image segmentation is to be performed, within an electronic device configured for performing image processing;
        (ii) quantizing the image to obtain information utilized in selecting area in pre-determined areas, comprising areas of definite foreground, definite background, initial foreground, initial background;
        (iii) estimating areas of the image covered by the definite foreground, the definite background, the initial foreground, and the initial background;
        (iv) assigning sets of risk values to each of said definite foreground, the definite background, the initial foreground, and the initial background;
        (v) wherein each of said risk values comprises a cost value $C_{fb}$ if segmentation decides on foreground for an element that should be background, and a cost value $C_{bf}$ if segmentation decides on background for an element that should be in the foreground;
        (vi) wherein for said initial foreground, a cost value $C_{bf}$ is assigned which is higher than cost value $C_{fb}$, while for said initial background a cost value $C_{fb}$ is assigned which is higher than cost value $C_{bf}$;
        (vii) wherein for said definite foreground, a cost value $C_{bf}$ is assigned which is significantly larger than cost value $C_{fb}$, while for said definite background a cost value $C_{fb}$ is assigned which is significantly higher than cost value $C_{bf}$ with a difference between cost values assigned to the definite foreground and definite background being significantly larger than assigned to the initial foreground and initial background; and
        (viii) making segmentation decisions for the pixels in the image based on information from that image, and modifying those segmentation decisions based on the cost values of the area in which the pixels are found.

2. The apparatus as recited in claim 1, wherein said apparatus comprises an image capture device selected from the group of still and video image capture devices consisting of cameras, cellular phones, pads, tablets, laptops, notebooks and surveillance equipment.

3. The apparatus as recited in claim 1, wherein said instructions when executed by the processor further performing steps comprising utilizing a known object detection process for estimating the extent of said definite foreground, and said initial foreground.

4. The apparatus as recited in claim 2, wherein said known object detection process comprises a human object detection process.

5. The apparatus as recited in claim 1, wherein said instructions when executed by the processor are configured for making said segmentation decisions as determined in response to information about the image as selected from the group of available image information consisting of depth information, contrast mapping, and texture mapping.

6. The apparatus as recited in claim 1, wherein assigning of risk values can be determined by a user.

7. The apparatus as recited in claim 6, wherein said instructions when executed by the processor further perform steps comprising making an initial presumption about the object area based on contact area of said selection point detected on a touch screen input.

8. The apparatus as recited in claim 1, wherein said selection point for an object being selected comprises a touch screen input.

9. The apparatus as recited in claim 1, wherein said instructions when executed by the processor are configured to assess overall risk R as:

$$R = C_{fb}p(H_{fore}|H_{back})p(H_{back}) + C_{bf}p(H_{back}|H_{fore})p(H_{fore})$$

where H is a hypothesis, Hfore and Hback is a label of the pixel either foreground or background, with function p( ) indicating probability which can be any real value between 0 and 1, so that value p(Hfore) and p(Hback) are prior probability, and p(Hfore|Hback) and p(Hback|Hfore) are conditional probability.

10. The apparatus as recited in claim 9, wherein said instructions when executed by the processor are configured for minimizing overall risk R by modifying a classifier and deciding unknown pixel x being in the foreground if $$\frac{C_{bf}p(H_{back}|H_{fore})p(H_{fore})}{C_{fb}p(H_{fore}|H_{back})p(H_{back})} > 1.$$

11. An apparatus for segmenting an object from within an image, comprising:
 (a) at least one processor configured for processing of a received image; and
 (b) memory storing instructions;
 (c) said instructions when executed by the processor performing steps comprising:
  (i) receiving an image, comprising pixels, and at least a selection point for an object being selected in said image to which image segmentation is to be performed, within an electronic device configured for performing image processing;
  (ii) receiving additional image information comprising depth information, or contrast mapping, or texture mapping, or any combination of this information, upon which to assess risk and make segmentation decisions;
  (iii) quantizing the image to obtain information utilized in selecting area in pre-determined areas, comprising areas of definite foreground, definite background, initial foreground, initial background;
  (iv) estimating areas of the image covered by the definite foreground, by the definite foreground, the definite background, the initial foreground, and the initial background;
  (v) assigning sets of risk values to each of said definite foreground, the definite background, the initial foreground, and the initial background;
  (vi) wherein each of said risk values comprises a cost value $C_{fb}$ if segmentation decides on foreground for an element that should be background, and a cost value $C_{bf}$ if segmentation decides on background for an element that should be in the foreground;
  (vii) wherein for said initial foreground, a cost value $C_{bf}$ is assigned which is higher than cost value $C_{fb}$, while for said initial background a cost value $C_{fb}$ is assigned which is higher than cost value $C_{bf}$;
  (viii) wherein for said definite foreground, a cost value $C_{bf}$ is assigned which is significantly larger than cost value $C_{fb}$, while for said definite background a cost value $C_{fb}$ is assigned which is significantly higher than cost value $C_{bf}$ with a difference between cost values assigned to the definite foreground and definite background being significantly larger than assigned to the initial foreground and initial background; and
  (ix) making segmentation decisions for the pixels in the image based on information from that image, and modifying those segmentation decisions based on the cost values of the area in which the pixels are found.

12. A method of segmenting an object from within an image, comprising:
 (a) receiving an image, comprising pixels, and at least a selection point for an object being selected in said image to which image segmentation is to be performed, within an electronic device configured for performing image processing;
 (b) quantizing the image to obtain information utilized in selecting area in pre-determined areas, comprising areas of definite foreground, definite background, initial foreground, initial background;
 (c) estimating areas of the image covered by the definite foreground, the definite background, the initial foreground, and the initial background;
 (d) assigning sets of risk values to each of said definite foreground, the definite background, the initial foreground, and the initial background;
 (e) wherein each of said risk values comprises a cost value $C_{fb}$ if segmentation decides on foreground for an element that should be background, and a cost value $C_{bf}$ if segmentation decides on background for an element that should be in the foreground;
 (f) wherein for said initial foreground, a cost value $C_{bf}$ is assigned which is higher than cost value $C_{fb}$, while for said initial background a cost value $C_{fb}$ is assigned which is higher than cost value $C_{bf}$;
 (g) wherein for said definite foreground, a cost value $C_{bf}$ is assigned which is significantly larger than cost value $C_{fb}$, while for said definite background a cost value $C_{fb}$ is assigned which is significantly higher than cost value $C_{bf}$ with a difference between cost values assigned to the definite foreground and definite background being significantly larger than assigned to the initial foreground and initial background; and
 (h) making segmentation decisions for the pixels in the image based on information from that image, and modifying those segmentation decisions based on the cost values of the area in which the pixels are found.

13. The method as recited in claim 12, further comprising utilizing a known object detection process for estimating the extent of said definite foreground, and said initial foreground.

14. The method as recited in claim 13, wherein said known object detection process comprises a human object detection process.

15. The method as recited in claim 12, wherein said segmentation decisions are further determined in response to information about the image selected from the group of available image information consisting of depth information, contrast mapping, texture mapping.

16. The method as recited in claim 12, wherein assigning of risk values is determined by a user.

17. The method as recited in claim 12, wherein said selection point for an object being selected comprises a touch screen input, and making an initial presumption about the object area based on contact area of said selection point detected on the touch screen input.

18. The method as recited in claim 12, wherein overall risk R is defined as: $R=C_{fb}p(H_{fore}|H_{back})p(H_{back})+C_{bf}p(H_{back}|H_{fore})p(H_{fore})$
 where H is a hypothesis, Hfore and Hback is a label of the pixel either foreground or background, with function p( ) indicating probability which can be any real value between 0 and 1, so that value p(Hfore) and p(Hback) are prior probability, and p(Hfore|Hback) and p(Hback|Hfore) are conditional probability.

19. The method as recited in claim 18, wherein overall risk R is minimized by modifying a classifier and deciding unknown pixel x being in the foreground if $$\frac{C_{bf}\, p(H_{back}\mid H_{fore})p(H_{fore})}{C_{fb}\, p(H_{fore}\mid H_{back})p(H_{back})} > 1.$$

20. The method as recited in claim 12, wherein said electronic device is selected from the group of imaging devices consisting of cameras, cellular phones, pads, tablets, laptops, notebooks and surveillance equipment.

* * * * *